United States Patent [19]

Myers

[11] Patent Number: 4,548,438

[45] Date of Patent: Oct. 22, 1985

[54] MOBILE CAMPING APPARATUS

[76] Inventor: Robert H. Myers, 983 Moorefield Rd., Springfield, Ohio 45502

[21] Appl. No.: 535,031

[22] Filed: Sep. 23, 1983

[51] Int. Cl.$^4$ .............................................. B60P 3/34
[52] U.S. Cl. ................... 296/160; 296/164; 296/170; 296/176; 296/26; 135/88
[58] Field of Search ............... 296/160, 164.5, 169.70, 296/174, 176, 161, 166, 172, 26; 135/88

[56] References Cited

U.S. PATENT DOCUMENTS

| | | | |
|---|---|---|---|
| 3,019,455 | 2/1962 | Carte | 296/160 |
| 3,325,206 | 6/1967 | Carlson | 135/88 X |
| 3,506,299 | 4/1970 | Arnold et al. | 296/170 |
| 3,514,148 | 3/1970 | Hunter et al. | 296/156 |
| 3,659,893 | 5/1972 | Steele | 296/164 |
| 4,055,366 | 10/1977 | Lee | 296/160 |
| 4,077,662 | 3/1978 | Kauffman | 296/165 |
| 4,251,102 | 2/1981 | Lee | 296/160 |

FOREIGN PATENT DOCUMENTS

| | | | |
|---|---|---|---|
| 3143713 | 5/1983 | Fed. Rep. of Germany | 296/165 |
| 2041837 | 9/1980 | United Kingdom | 296/164 |
| 2086315 | 5/1982 | United Kingdom | 296/160 |

*Primary Examiner*—Robert B. Reeves
*Assistant Examiner*—Russell D. Stormer
*Attorney, Agent, or Firm*—Jacox & Meckstroth

[57] ABSTRACT

Mobile camping apparatus which includes a van type of automotive vehicle. The van has a body provided with a chamber therein which serves as living quarters. The roof of the body is pivotally movable to a raised position. Bed structure mounted adjacent the upper portion of the body serves as a ceiling for the living quarters when the bed structure is not positioned for use. The bed structure is moved laterally with respect to the body as the roof pivotally moves upwardly. The bed structure becomes positioned for use when the bed structure is substantially at the side of the body at the upper portion thereof. When the bed structure is so positioned for use, the living quarters is increased in volume and has substantial head room adjacent the bed structure. Motor members, screw members, linkage members are included in the apparatus for laterally moving the bed structure and for pivotally moving the roof.

Flexible, canvas-like wall material is attached to the roof and to the bed structure and to the roof and unfolds to an enclosing condition as the roof pivotally moves upwardly.

6 Claims, 9 Drawing Figures

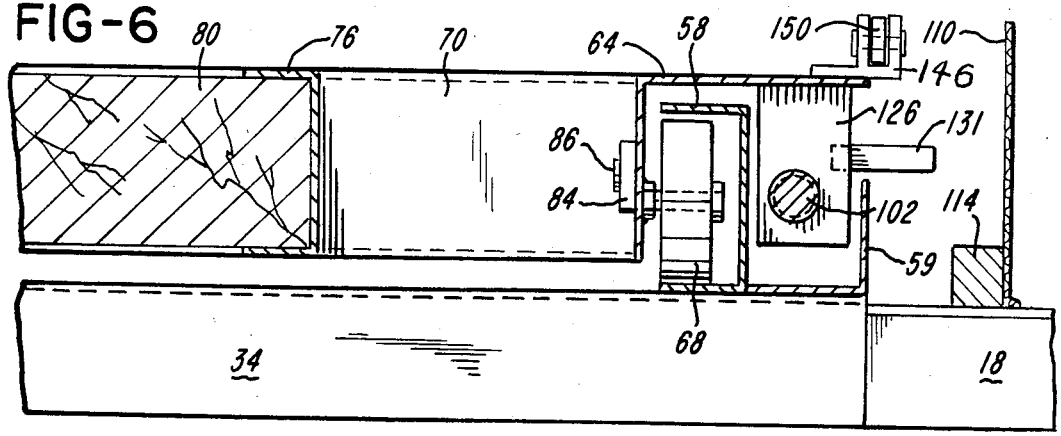
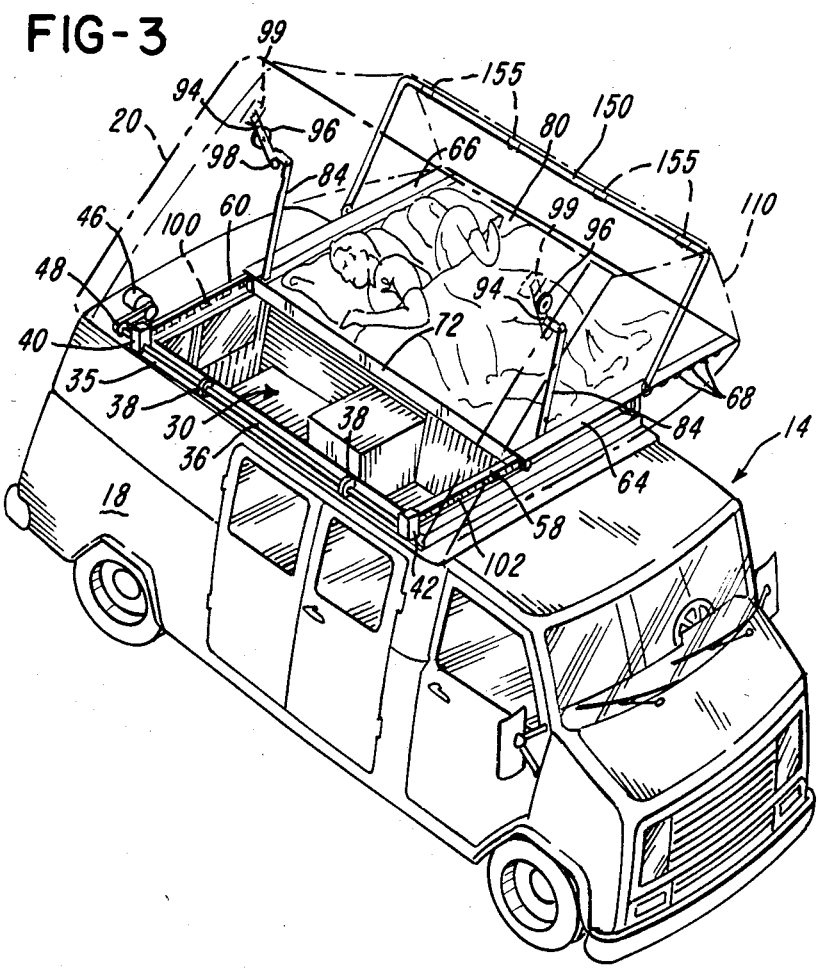

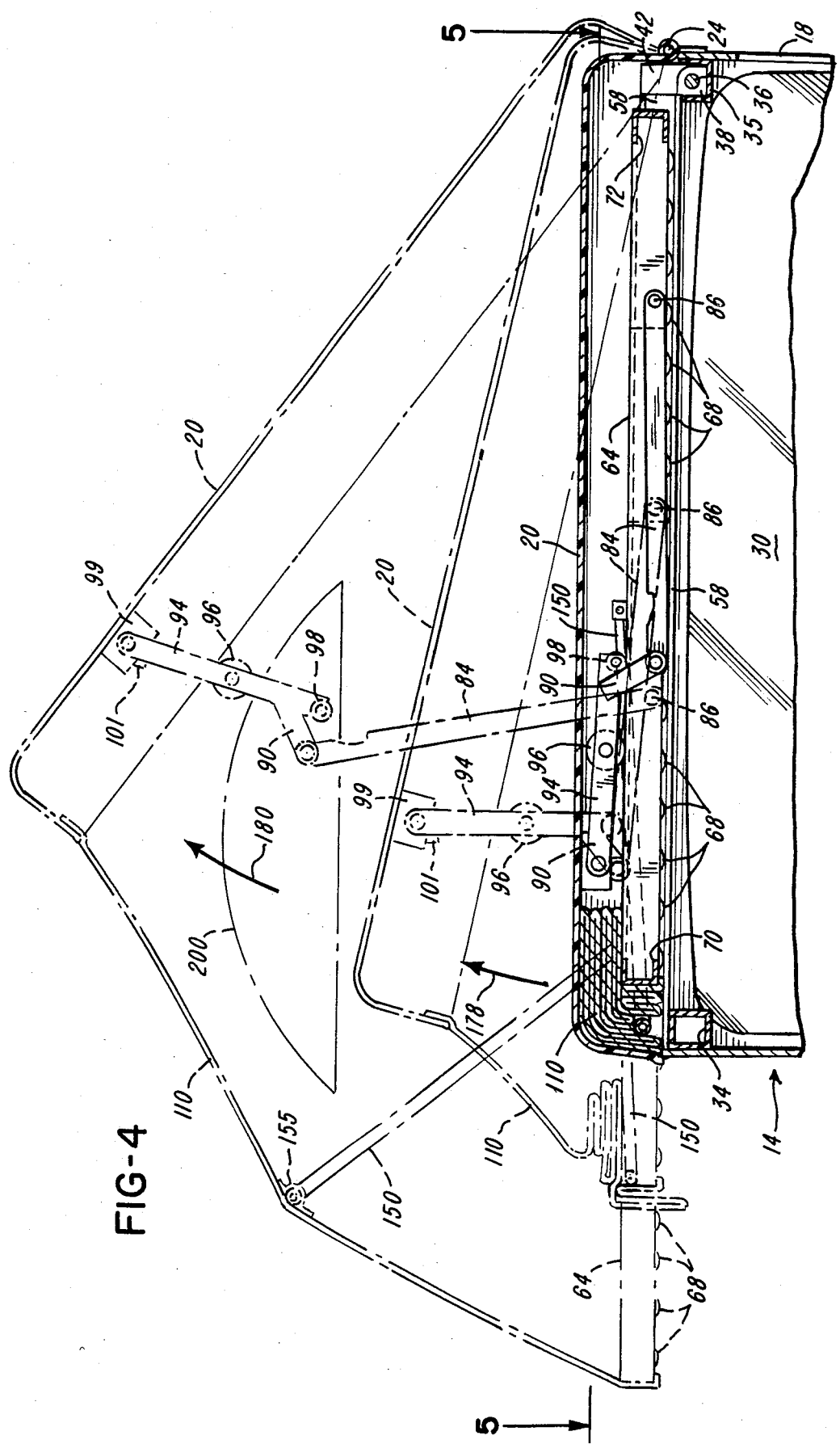

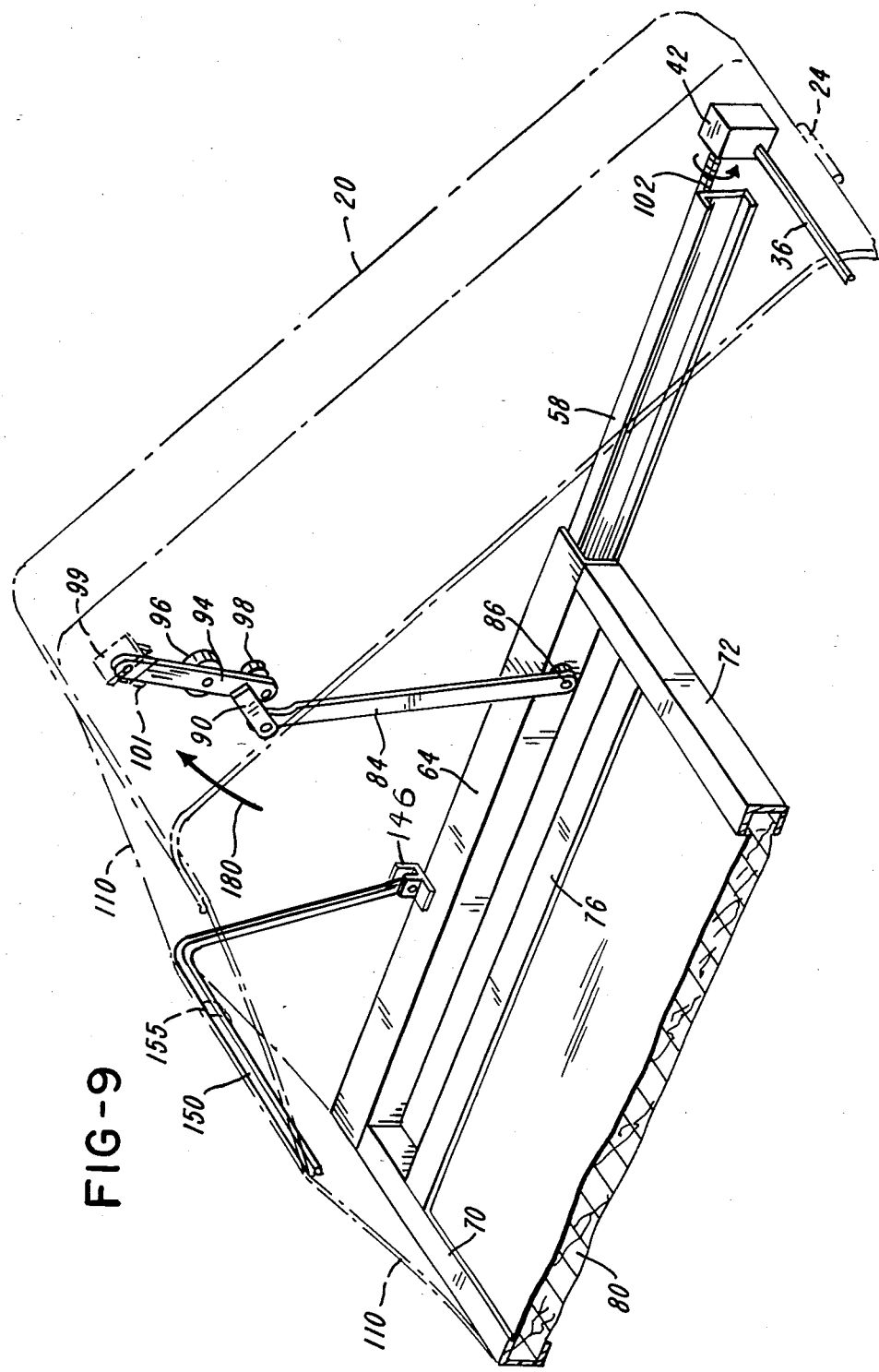

4,548,438

MOBILE CAMPING APPARATUS

BACKGROUND OF THE INVENTION

Numerous types of mobile camping equipment have been created in which sleeping accommodations are available. Known mobile camping equipment presents various problems which the apparatus herein disclosed is constructed to solve.

One of the major problems involved in known mobile camping equipment in which a van type automotive vehicle is involved is that when the sleeping accommodations are positioned for the normal use, the living quarters in the van are severely restricted.

It is an object of this invention to provide mobile camping apparatus in which an automotive van or the like includes bed structure which is operable to a substantially lateral position with respect to the van, so that substantially all of the space within the van is available for use and in which additional "head room" is provided within the van when the bed structure is in its position for use. Thus, when the bed structure is positioned for usage, the entire normal space within the van plus additional head room is provided.

Another object of this invention is to provide such mobile camping apparatus in which the van is arranged for normal usage when the bed structure is not positioned for usage.

BRIEF DESCRIPTION OF THE VIEWS OF THE DRAWINGS

FIG. 3 is a perspective view with parts shown in phantom and showing the interior of the van and showing the apparatus arranged for camping use. FIG. 3 also illustrates movement of portions of the apparatus to position the apparatus in condition for camping.

FIG. 4 is an enlarged sectional view taken substantially on line 4—4 of FIG. 1.

FIG. 6 is an enlarged sectional view taken substantially on line 6—6 of FIG. 5.

FIGS. 7, 8, and 9 illustrate successive movement of parts of the apparatus to place the apparatus in condition for camping.

DETAILED DESCRIPTION OF THE INVENTION

Figure 1:
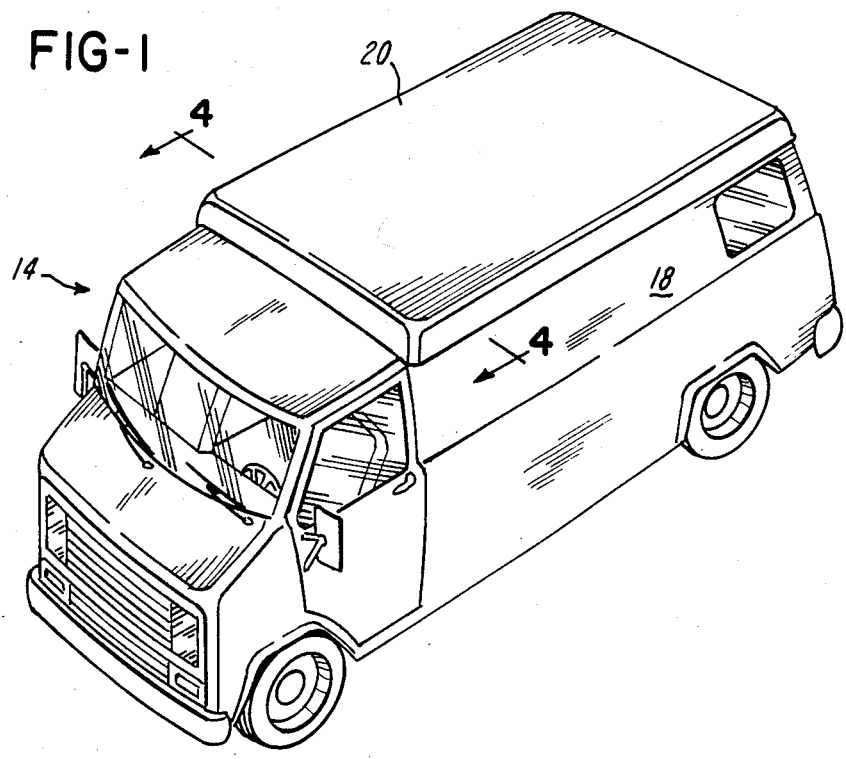
FIG. 1 is a perspective view of mobile camping apparatus of this invention in association with a van and in which the apparatus is arranged to permit normal usage of the van.

The mobile camping apparatus of this invention includes a vehicle in the form of a van 14. The van 14 has a body 18 and a roof 20. The roof 20 is hingedly attached to the body 18 by means of one or more hinges 24, shown in FIGS. 4, 5, 7, 8, and 9. Within the body 18 is a chamber 30 which is adapted to serve as living quarters. Within the body 18, adjacent the upper portion thereof and extending along the left hand side of the chamber 30, is a support member 34, shown in FIG. 4. Within the body 18, adjacent the upper portion thereof and extending along the right hand side of the chamber 30 is a channel member 35, shown in FIGS. 3 and 6. Mounted upon the body 18, adjacent the upper portion thereof and extending along the right hand side of the chamber 30, within the channel member 35, is a connecting shaft 36. The connecting shaft 36 is rotatably journaled in bearing housings 38 which are attached to the channel member 35, intermediate the ends of the connecting shaft 36. At the rearward portion of the body 18, the connecting shaft 36 extends through a gear box 40. At the foward end portion of the body 18 the connecting shaft 36 extends into a gear box 42.

Adjacent the rearward portion of the body 18 is a motor 46, which is preferably an electrically operable motor, which is energized through electrical conductors, not shown, connected to a source of electrical energy, not shown. A drive pulley 48 is attached to the connecting shaft 36 adjacent the gear box 40. The motor 46 has a drive pulley 50 attached thereto for rotation therewith. A drive belt 52 encompasses the drive pulleys 48 and 50.

Extending transversely across the body 18 at the upper forward portion thereof and attached thereto is a U-shape rail member 58, which has one end portion adjacent the gear box 42. Attached to the U-shape rail member 58 and extending therefrom parallel thereto and along the length thereof is an L-shape channel member 59, best shown in FIG. 6. Extending transversely across the body 18 and attached thereto at the upper rearward portion thereof is a U-shape rail member 60, which has an end portion adjacent the gear box 40. Attached to the U-shape rail member 60 and extending therefrom parallel thereto is an L-shape channel member 61.

Extending along the U-shape rail member 58, adjacent and parallel thereto, is an L-shape frame member 64, shown in FIG. 6. Extending along the U-shape rail member 60, adjacent and parallel thereto, is a frame member 66.

A plurality of wheel members 68 are rotatably attached to each of the frame members 64 and 66, and are positioned within the U-shape rail members 58 and 60 and roll therewithin and support the frame members 64 and 66. The U-shape rail members 58 and 60 are oriented so that the legs thereof are horizontal, and the wheel members 68 are positioned between the upper and lower legs of the U-shape rail members 58 and 60.

Figure 5:
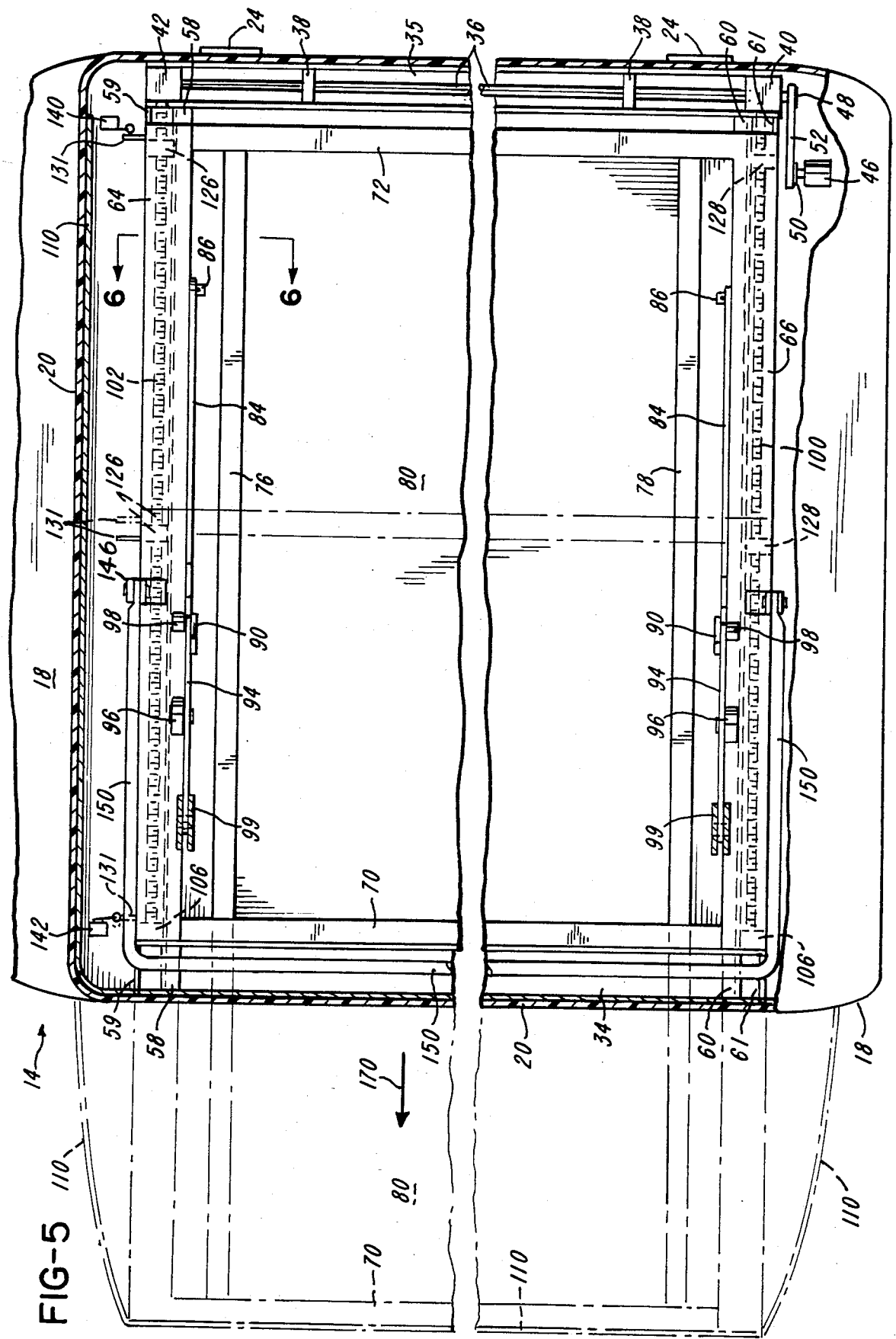
FIG. 5 is a sectional view taken substantially on line 5—5 of FIG. 4 and drawn on substantially the same scale as FIG. 4.

As shown in FIG. 5, attached to the frame members 64 and 66 and extending therebetween are frame members 70 and 72. Spaced from the frame member 64 and parallel thereto and attached to the frame members 70 and 72 is an intermediate support member 76. Spaced from the frame member 66 and parallel thereto and attached to the frame members 70 and 72 is an intermediate support member 78, shown in FIG. 5. The intermediate support members 76 and 78 and the frame members 70 and 72 support a bed member 80.

Attached to the frame members 64 and 66 are arm members 84, each of which has an end portion pivotal about an attachment member 86. The other end of each of the arm members 84 is pivotally attached to a connector member 90. Each connector member 90 is rigidly attached to a lever member 94. The lever member 94 has a roller 96 intermediate the ends thereof and a roller 98 adjacent one end thereof. The other end of the lever member 94 is pivotally attached to a bracket 99 which is secured to the roof 20 on the lower surface thereof. The bracket 99 has an abutment portion 101.

Extending from the gear box 40 and along the U-shape rail member 60 is a threaded rod 100. Extending from the gear box 42 and along the U-shape rail member 58 is a threaded rod 102, best shown in FIG. 6.

The gear boxes 40 and 42 are of the type provided with gear members therewithin, not shown. The gear members within the gear boxes 40 and 42 join the connecting shaft 36 to the threaded rods 100 and 102. The gear members within the gear boxes 40 and 42 are such that the rate of rotation of the threaded rods 100 and 102 is significantly less than the rate of rotation of the connecting shaft 36.

As best shown in FIGS. 5 and 6, the L-shape frame member 64 has nuts 126 attached thereto, and the L-shape frame member 66 has nuts 128 attached thereto. The threaded rod 102 threadedly extends through the nuts 126. The threaded rod 100 extends through the nuts 128.

The threaded rods 100 and 102 are rotatably journaled in bearings 106 at one end thereof. The other end of the threaded rod 100 is connected to the gear box 40, and the other end of the threaded rod 102 is connected to the gear box 42.

Attached to each nut 126 is an actuator member 131 which is engageable with limit switches 140 and 142 for operation thereof.

Attached to the roof 20 and to the frame member 70 and extending the length of the frame member 70 is a flexible wall member 110, which may be of canvas or any other suitable tent-like material. The flexible wall member 110 also is attached to sealing strips 114 which are attached to the top portion of the body 18 and extend thereacross adjacent the L-shape channel members 59 and 61.

Pivotally attached to the L-shape support members 64 and 66, by means of brackets 146, is a U-shape brace member 150. The brace member 150 has a central portion which extends between the frame members 64 and 66 and which is attached to the flexible wall member 110 by means of tie members 155.

OPERATION

Figure 2:
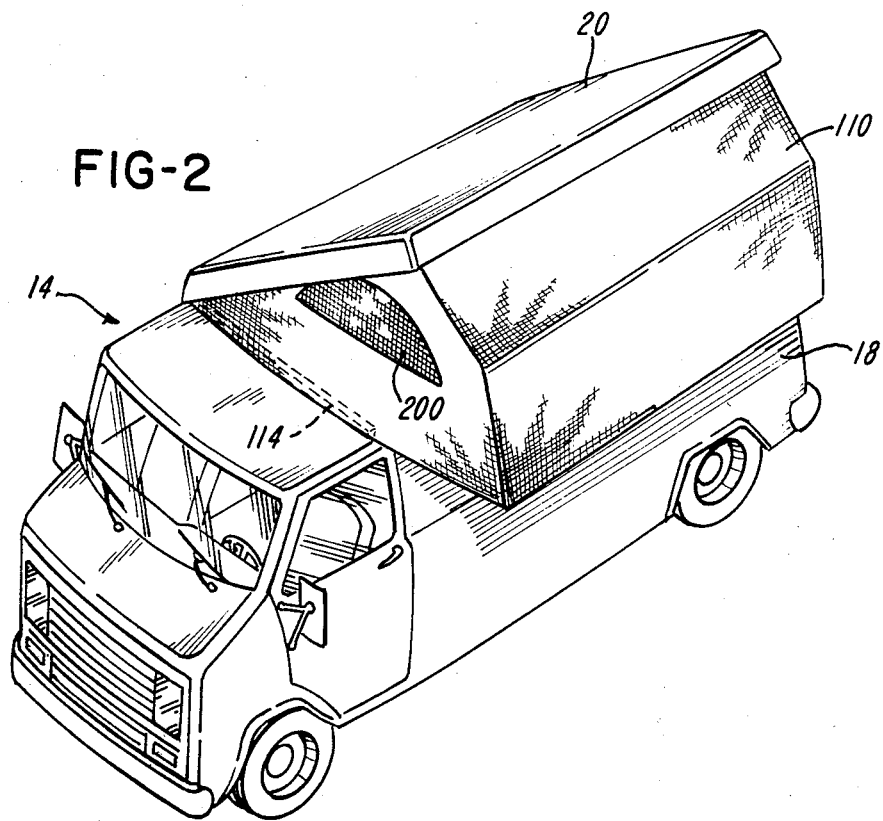
FIG. 2 is a perspective view of the mobile camping apparatus of FIG. 1 showing the apparatus arranged for camping use.

FIG. 1 shows the mobile camping equipment of this invention arranged for normal travel and use conditions. In the condition for normal travel the bed structure which includes the bed member 80 forms a ceiling over the chamber or living quarters 30. FIGS. 2 and 3 show the mobile camping equipment of this invention in condition for camping use.

When the mobile camping equipment is arranged in the manner shown in FIG. 1, and it is desired to change to the conditions shown in FIGS. 2 and 3, the motor 46 is energized and rotates the drive belt 52. The drive belt 52 rotates the drive pulley 48 and the connecting shaft 36. The connecting shaft 36, through the gear boxes 40 and 42 drives threaded rods 100 and 102. The gears within the boxes 40 and 42 are such that the threaded rods 100 and 102 rotate at a much lower rate than the rate of rotation of the connecting shaft 36. Due to the fact that the threaded rods 100 and 102 are journaled in bearings 106, the threaded rods 100 and 102 do not have axial movement. Therefore, as the threaded rods 100 and 102 rotate, the nuts 126 and 128 travel along the threaded rods 100 and 102, from the right side of the body 18 toward the left side of the body 18. Travel of the nuts 126 and 128 causes travel of the frame members 64 and 66. As stated and as shown, the frame members 64 and 66 are supported by the wheel members 68 which roll between the horizontal legs of the U-shape rail members 58 and 60, respectively. Thus, as the frame members 64 and 66 are moved, the wheel members 68 rotate and travel upon and within the U-shape rail members 58 and 60 and support the frame members 64 and 66 in the travel thereof. The intermediate support members 76 and 78 and the bed member 80 travel with the frame members 64 and 66, as illustrated by arrows 170 in FIGS. 5 and 8. Thus, the bed structure, including the bed member 80, is moved laterally with respect to the body 18, as the frame members 64 and 66 are supported by the wheel members 68 which roll upon and within the rail members 58 and 60.

Figure 7:
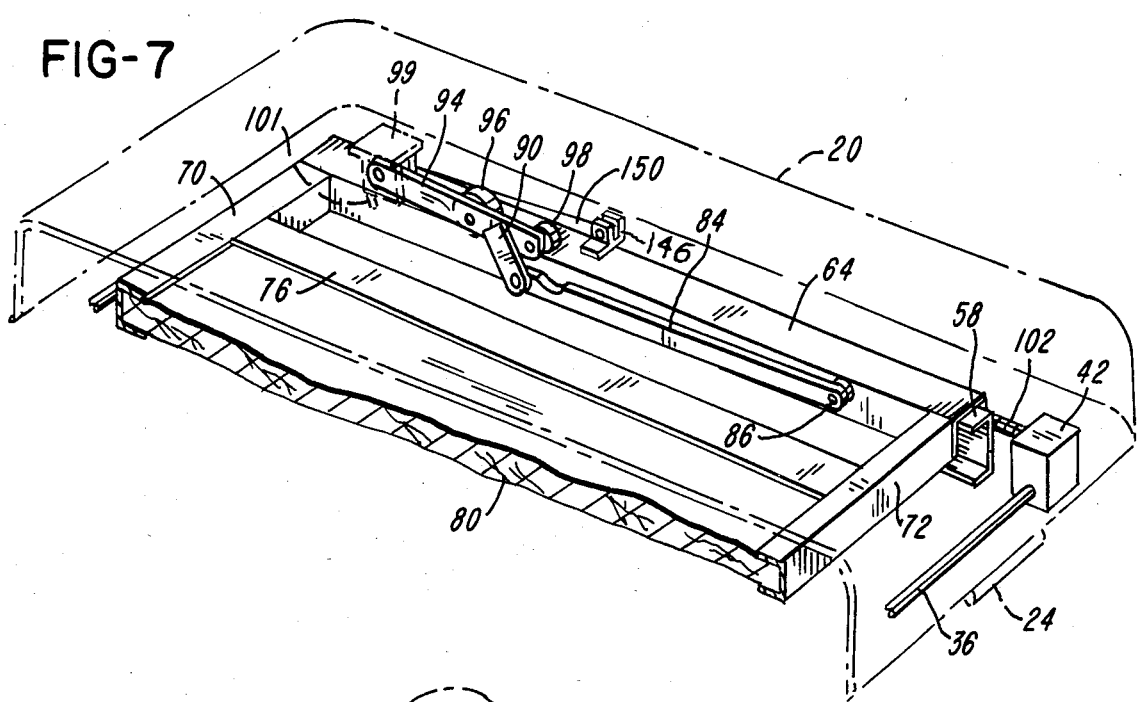

As the frame members 64 and 66 travel in a right to left direction with respect to the body 18, the frame members 64 and 66 move the arms 84 in a right to left direction. As shown in FIGS. 4 and 7, the arms 84 and the lever 94 are substantially horizontal when the bed member 80 is in its maximum right position, serving as a ceiling over the chamber 30. The roller 96 of each of the levers 94 rests upon the L-shape frame members 64 and 66. As the frame members 64 and 66 travel from right to left as illustrated by arrows 170, the arms 84 exert a force upon the connector members 90, and the lever members 94 travel a short distance along the upper surface of the frame members 64 and 66, as the rollers 96 which are attached to the lever members 94 roll upon the frame members 64 and 66.

Figure 8:
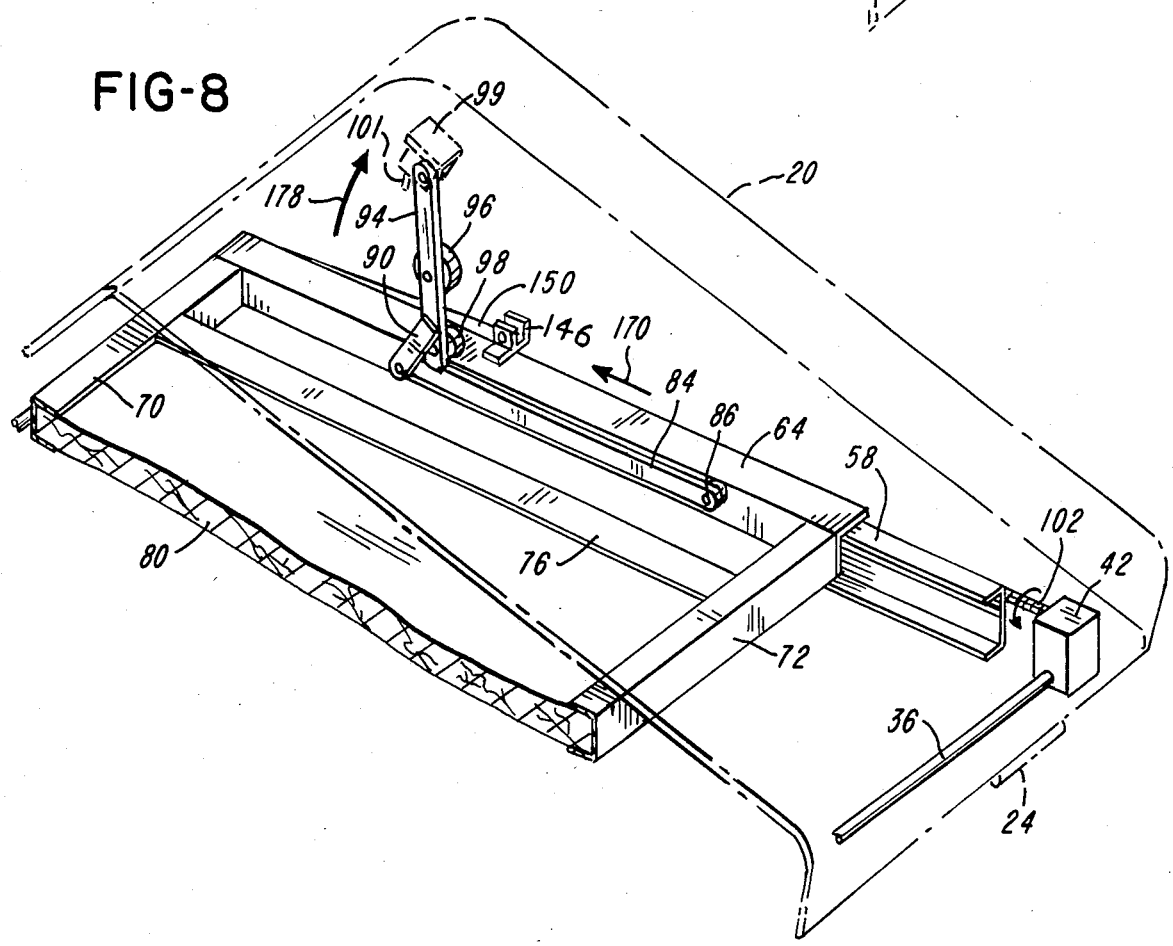

Due to the fact that the lever members 94 are attached to the roof 20 by means of the brackets 99, the lever members 94 apply a force upon the roof 20, as the arms 84 travel from right to left. Thus, the roof 20 is urged upwardly and begins to pivotally move upwardly about the hinges 24, as illustrated in FIGS. 4 and 7. As the frame members 64 and 66 continue to move the arms 84 in right to left travel, continued pressure is applied to the lever members 94, through the connector members 90. Therefore, the lever members 94 pivotally move upwardly as lever members 94 move the roof 20 upwardly, as illustrated in FIGS. 4 and 8. The lever members 94 pivotally move, and the roof 20 pivotally moves, as illustrated by arrows 178, until the lever members 94 assume substantial right angles with respect to the frame members 64 and 66, and the lower ends of the lever members 94 engage the arms 84.

As the frame members 64 and 66 force the arms 84 farther in a right to left direction, the arms 84 pivotally move as lever members 94 continue to urge the roof 20 to pivotally move upwardly, as illustrated in FIGS. 4 and 9, as illustrated by arrows 180. The arms 84 and the lever members 94 continue to pivotally move the roof 20 upwardly until the roof reaches the position shown FIGS. 4 and 9. In this position, each of the lever members 94 engages the abutment portion 101 which is a part of each bracket 99. Thus, the roof 20 is firmly retained in the position thereof shown in FIGS. 4 and 9 by the threaded rods 100 and 102, by the arms 84 and by the lever members 94. At this position a substantial part of the frame members 64 and 66 is positioned laterally in cantilever fashion with respect to the body 18, as illustrated in FIG. 4. Thus, a substantial portion of the bed 80 is at a lateral position with respect to the body 18. Due to the fact that the wheel members 68 travel upon the U-shape rail members 58 and 60, between the horizontal upper and lower horizontal legs thereof, at least some of the wheel members 68 may engage the upper legs of the U-shape rail members 58 and 60 when the frame members 64 and 66 extend outwardly in cantilever fashion from the rail members 58 and 60.

The actuator member 131 engages the limit switch 142 to deenergize the electric motor 46 when the roof 20 has moved to its maximum upward position.

As the roof 20 pivotally moves upwardly and as the frame member 70 moves outwardly from the body 18, the flexible wall member 110 is unfolded and stretched between the roof 20 and the frame member 70 at the left side of the body 18. Also as the flexible wall member 110 is stretched, the U-shape brace member 150 is pivotally moved, as illustrated in FIG. 4 and retains the flexible wall member 110 in a taut condition between the roof 20 and frame member 70.

As the roof 20 pivotally rises and as the flexible wall member 110 is stretched, the portions of the flexible wall member 110 at the forward and rearward ends of the body 18 are stretched into position between the sealing strips 114 and the roof 20, as illustrated in FIGS. 2 and 3. FIG. 2 shows that an end portion of the flexible wall member 110 may have a window 200 therein for ventilation.

Thus, the mobile camping equipment is arranged for sleeping therein. As shown in FIG. 3, the chamber or living space 30 within the body 18 has greater availability for use. The bed structure has moved from a ceiling position above the living space 30 and the head room available within the living space 30 is greater when the bed member 80 is positioned as shown in FIG. 3. Thus, the mobile camping equipment of this invention provides sleeping quarters when the bed member 80 is positioned as shown in FIG. 3, and when the bed member 80 is positioned as shown in FIG. 3 increased living quarters 30 are provided within the body 18.

When it is desired to retract the roof 20 and the bed member 80, the electric motor 46 is energized to rotate in a reverse direction, and the members discussed above move in a direction to retract the frame members 64 and 66, to move the bed member 80 to the position thereof shown in FIG. 7, and to lower the roof 20 to the position thereof shown in FIG. 1.

Although the preferred embodiment of the mobile camping apparatus of this invention has been described, it will be understood that within the purview of this invention various changes may be made in the form, details, proportion and arrangement of parts, the combination thereof and the mode of operation, which generally stated consist in a structure within the scope of the appended claims.

The invention having thus been described, the following is claimed:

1. Mobile camping apparatus of the type which includes a van type of automotive vehicle provided with a body having an upper front portion and an upper rear portion and upper side portions, the improvement comprising a roof pivotally attached to an upper side portion of the body, a forward transverse horizontal rail member attached to the body adjacent the upper front portion and a rear transverse horizontal rail member attached to the body adjacent the upper rear portion, horizontal bed structure supported upon the rail members, the bed structure having a forward portion supported by the forward transverse rail member of the body and a rear portion supported by the rear transverse rail member, the bed structure being movable horizontally upon the rail members from a position between the upper side portions to a position in which at least a part of the forward portion and a part of the rear portion of the bed structure is positioned laterally beyond an upper side portion of the body, a pair of arm members, there being an arm member pivotally attached to the forward portion of the bed structure and an arm member pivotally attached to the rear portion of the bed structure, a pair of levers, each lever being pivotally attached to one of the arm members, each lever also being pivotally attached to the roof, a pair of nuts, there being a nut rigidly attached to the bed structure adjacent the forward portion thereof and a nut rigidly attached to the bed structure adjacent the rear portion thereof, a pair of threaded rods, there being a transversely positioned threaded rod rotatably attached to the upper front portion of the body and a transversely positioned threaded rod rotatably attached to the upper rear portion of the body, each of the threaded rods extending through one of the nuts, electric motor means carried by the vehicle including control means for energization of the electric motor means, means joining the electric motor means to the threaded rods for simultaneous rotation of the threaded rods, whereby operation of the motor means rotates the threaded rods, and rotation of the threaded rods forces the bed structure to travel transversely with respect to the body, transverse travel of the bed structure forcing the arm members to move the levers and to move the roof pivotally with respect to the body as the levers and the arms pivotally move.

2. The mobile camping apparatus of claim 1 which includes flexible wall means, attachment means attaching the flexible wall means to the roof and to the bed structure and to the body to provide enclosure structure therebetween, rigid brace means pivotally attached to the bed structure and to a portion of the flexible wall means for retaining said portion of the flexible wall means in a desired position with respect to the roof and with respect to the bed structure and with respect to the body.

3. The mobile camping apparatus of claim 1 in which the means joining the electric motor means to the threaded rods comprises a connecting shaft which extends between the threaded rods.

4. Mobile camping apparatus of the type which includes a van type of automotive vehicle provided with a body having an upper front portion and an upper rear portion and upper side portions, the improvement comprising a roof pivotally attached to an upper side portion of the body, a transverse horizontal rail member attached to the body adjacent the upper front portion and a transverse horizontal rail member attached to the body adjacent the upper rear portion, horizontal bed structure supported upon the rail members, the bed structure having a forward portion adjacent the upper front portion of the body and a rear portion adjacent the upper rear portion of the body, the bed structure being movable horizontally upon the rail members from a position between the upper side portions of the body to a position in which at least a part of the forward portion and a part of the rear portion of the bed structure is positioned laterally beyond an upper side portion of the body, connector means attached to the bed structure adjacent the forward portion thereof and connector means attached to the bed structure adjacent the rear portion thereof, drive means rotatably attached to the upper front portion of the body and drive means rotatably attached to the rear portion of the body, the drive means being operably joined to the connector means for movement of the bed structure, pivotal linkage means pivotally attached to the bed structure adjacent the forward portion thereof and to the roof, pivotal linkage means pivotally attached to the bed structure adjacent the rear portion thereof, motor means carried by the vehicle including control means for energization of the motor means, means joining the motor means to the drive means for operation thereof, whereby operation of the motor means forces the bed structure to move upon the rail members as the bed structure moves transversely with respect to the body, transverse movement of the bed structure forcing the linkage means to move the roof pivotally with respect to the body.

5. The mobile camping apparatus of claim 4 which includes flexible wall means attached to the bed structure and to the roof, and brace means pivotally attached to the bed structure and to a portion of the flexible wall means for positioning said portion of the flexible wall means with respect to the bed structure and with respect to the roof.

6. Mobile camping apparatus of the type which includes a van type of automotive vehicle provided with a body having an upper front portion and an upper rear portion and upper side portions, the improvement comprising a roof pivotally attached to an upper side portion of the body, a transverse horizontal rail member attached to the body adjacent the upper front portion and a transverse horizontal rail member attached to the body adjacent the upper rear portion, horizontal bed structure supported upon the rail members, the bed structure having a forward portion adjacent the upper front portion of the body and a rear portion adjacent the upper rear portion of the body, the bed structure being movable horizontally upon the rail members from a position between the upper side portions to a position in which at least a part of the forward portion and a part of the rear portion of the bed structure is positioned laterally beyond an upper side portion of the body, a pair of arm members, there being an arm member pivotally attached to the forward portion of the bed structure, and an arm member pivotally attached to the rear portion of the bed structure, a pair of levers, each lever being pivotally attached to one of the arm members, each lever also being pivotally attached to the roof, motor means, drive means joining the motor means to the bed structure for movement of the bed structure upon the rail members, whereby operation of the motor means moves the bed structure, and movement of the bed structure forces the arm members to move the levers and movement of the levers forces the roof to move pivotally with respect to the body.

* * * * *